Nov. 1, 1966  H. P. HARTMANN  3,283,300

FLAT TIRE WARNING DEVICE

Filed Nov. 26, 1963

Helmut P. Hartmann
INVENTOR.

BY Randles O. Wyatt

ATTORNEY

United States Patent Office 3,283,300
Patented Nov. 1, 1966

3,283,300
FLAT TIRE WARNING DEVICE
Helmut P. Hartmann, 4112 Old Spanish Trail,
Houston, Tex.
Filed Nov. 26, 1963, Ser. No. 325,881
4 Claims. (Cl. 340—58)

This invention relates to new and useful improvements in a flat tire warning device.

It is an object of this invention to provide a means for warning the driver of a vehicle when a tire has lost the necessary amount of air to maintain the tire engaged with the rim.

Vehicles having tandem axles or four wheels on a single axle, suffer considerable loss when a tire becomes deflated, as the deflated tire becomes loose on the rim, and the other tire holds the vehicle level, preventing detection of the deflated tire, and holds the deflated tire at a position where the surface of the tire can contact the road surface and through friction thus generated, turn freely on the rim, soon destroying the tire, particularly when traveling on the highway at cruising speeds. It is an object of this invention to provide means for warning the driver of the vehicle that a tire has been deflated as soon as that tire loses enough air to become loosely mounted on the rim.

It is another object of the invention to provide means for warning the driver of the vehicle that a tire has been deflated as soon as that tire becomes loose on the rim through a novel signal transmission means.

With the above and other objects in view, the invention has relation to certain novel features of construction, operation and arrangement of parts more particularly defined in the following specification and illustrated in the accompanying drawings, wherein.

Figure 1:
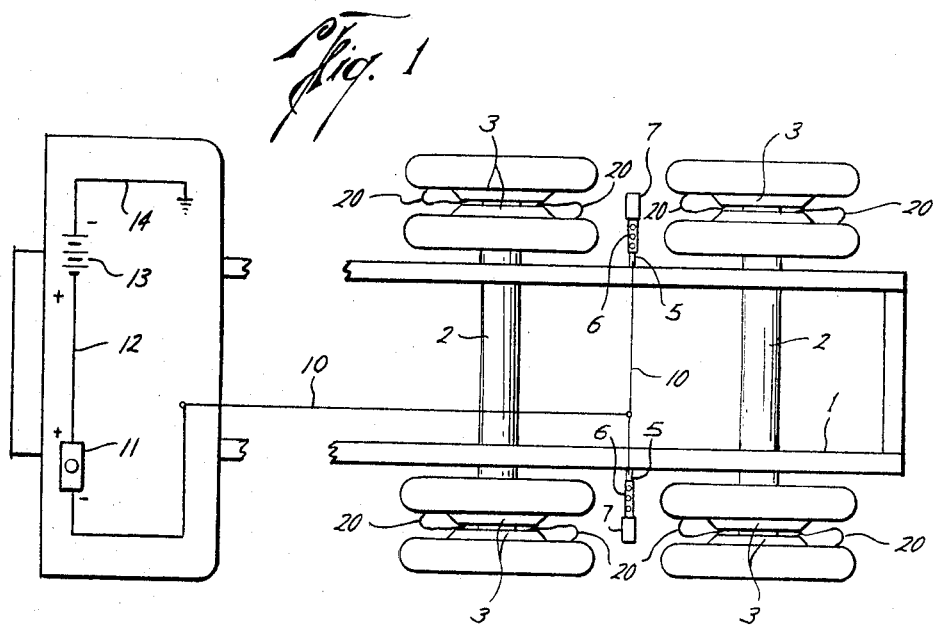
FIGURE 1 is a top plan view of the device mounted on a tandem axle vehicle, and showing the electrical diagram of the circuit employed.
Figure 3:
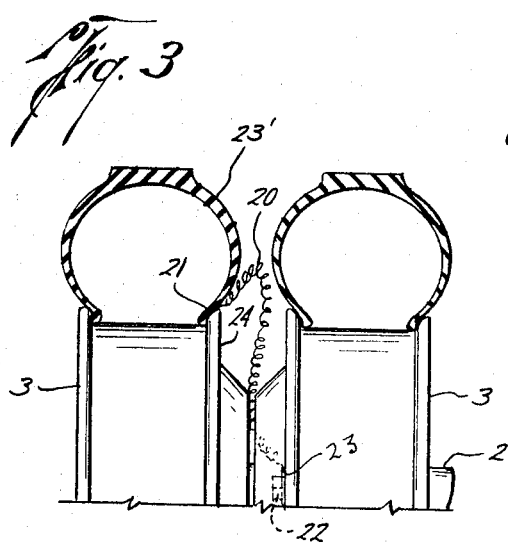
FIGURE 3 is a cross sectional elevational view of the striker mechanism in inactive position attached to a tire and wheel of a vehicle.
Figure 2:
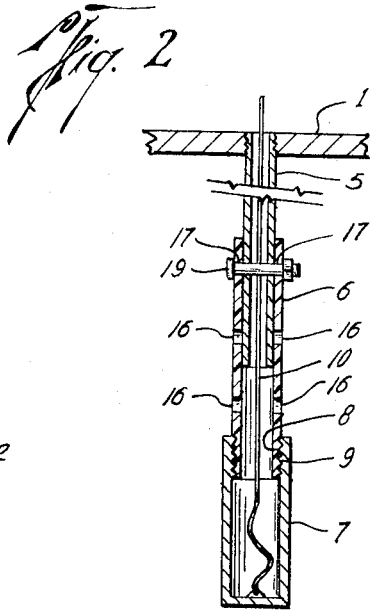
FIGURE 2 is an enlarged, cross sectional longitudinal view of the signal transmitting means employed.
Figure 4:
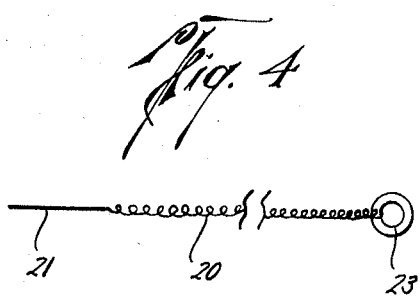
FIGURE 4 is an enlarged fragmentary view of the striker employed.

Referring now more particularly to the drawings, the numeral 1 designates a vehicle framework, such as one having tandem axles 2, 2 and dual wheels 3, 3 on each end of each axle 2, 2. Mounted on the framework 1 and extending laterally therefrom at a point midway between the pair of dual wheels 3, 3, at each location on the frame, are the tubular signal receiving members which have one member 5 anchored to the frame, and a telescoping member 6 detachably mounted on the member 5 and the anvil member 7 mounted on the extended end of the member 6. The extended end of the member 6 is externally threaded as at 8 to receive the internally threaded end 9 of the member 7.

The member 6 has a series of diametrically opposed ports 16, 16 and the member 5 has the diametrically opposed ports 18, 18. A suitable bolt, as 19, is selectively mounted in the aligned ports 16, 16 and 18, 18 to anchor the parts 5 and 6 at the desired position.

An electrical circuit conduit 10 is secured at one end to the member 7 and extends through the members 5, 6, 7 and leads to the minus side of the signal light 11, which may be mounted on the dashboard of the vehicle, or any other suitable place in the vehicle cab (not shown) and the wire 12 leads from the plus side of the light 11 to the plus side of the battery 13 and the line 14 leads from the minus side of the battery 13 back to the frame 1.

The striker 20 is composed of a length of spring wire having a metal contact member 21 formed in the extended end thereof and a washer 23 secured to the other end which is mounted on the lug bolt 22 of the vehicle.

In use, the contact member 21 is inserted between the tire 23' and the rim 24 and the tire inflated. So long as the tire remains inflated, the member 21 will be held securely in place between the tire and rim. One of these members is mounted on each wheel and tire, and where dual wheels are employed, preferably in a diametrically opposed relation. Where tandem axles with single wheels are employed, any location for each striker will be satisfactory. When a tire loses sufficient air to cause the tire to become loose on the rim and in danger of being destroyed by friction, the tire tends to move laterally on the rim, releasing the pressure against the side of the rim, and the tension on the spring wire will cause the contact member 21 to be withdrawn from between the tire and rim and, by centrifugal force, as well as the tendency of the spring wire to straighten, will be extended outwardly between the wheels and upon each rotation will strike the anvil 7, and the wire member 20 being grounded to the frame of the vehicle through the wheel 3, will complete a circuit through the signal light upon each contact, causing a flashing of the light 11, whereby the driver is warned that the tire is flat. In the event the anvil member 7 becomes coated with ice or mud, the striker contact member 21 will strike the anvil member 7 with sufficient force to rapidly knock such foreign matter from the surface of the anvil, so that only a relatively few rotations of the wheel will be made after the tire has become loose on the rim before the driver will be warned of the deflation.

If desired, the coiled wire portion of the striker, and the anvil, may be enclosed in light paper to protect the wire from accumulation of ice, and such covering readily replaced after each activation of the striker.

While the foregoing is considered a preferred form of the invention, it is by way of illustration only, the broad principle of the invention being defined by the appended claims.

What I claim is:

1. In a tire warning device, an anvil member mounted on and extending laterally from the framework of a motor vehicle, a striker mounted on a wheel of the vehicle, said striker having one end secured to said wheel and the other end maintained in position between the tire and rim of said wheel by the pressure of the tire against the rim while said tire is inflated, a signal light in said vehicle, an electrical current circuit through said anvil, said signal light and said striker, said circuit being completed by release of said striker from said tire and rim and the contact of said striker with said anvil.

2. In a tire warning device for use on vehicles having tandem wheels, an anvil member having one member mounted on and extendng laterally from the framework of the vehicle between the tandem wheels, another member in telescoping relation on said first mentioned member and selectively anchored thereto, and another member mounted on the extended end of said last mentioned member, a striker on each wheel of the vehicle having one end mounted on a lug of said wheel and the other end inserted between the tire and rim of said wheel and maintained therein by the inflation of said tire, a signal light mounted in said vehicle, a circuit through said anvil, sgnal light and striker completed upon release of said end of said striker from between said tire and rim and the contact of said striker with said anvil member.

3. In a flat tire warning device, an anvil member adjustably mounted on the framework of a vehicle having inflatable tires, said member extending laterally from said framework and the extended end being positioned adjacent the periphery of a tire, a spring wire connected at one end to a lug of a wheel of the vehicle and the other end having a striker mounted thereon and normally maintained in position between the tire and rim of the said vehicle by the pressure of inflation of the tire against the rim, a signal light in said vehicle, an electrical current maintained through said anvil member and said signal light and said striker upon release of said striker from between said tire and rim upon deflation of said tire and contact of said striker with the anvil member as the wheel rotates.

4. In a flat tire warning device for vehicles having tandem axles, an anvil member mounted on the framework of said vehicle and extending laterally therefrom, means for selectively positioning said anvil member longitudinally to dispose said anvil adjacent the periphery of the tires on said axles, a spring wire member connected at one end to a lug of a wheel of said vehicle and having a striker on the other end adapted to be maintained in position between a tire and rim by the pressure of the tire against the rim while said tire is inflated and which will be released when said tire is deflated and will move into striking relation with said anvil member, a signal light on said vehicle, an electric current circuit through said light, anvil and striker, the circuit being completed and the light ignited upon contact of said striker with said anvil.

References Cited by the Examiner
UNITED STATES PATENTS 2,368,617  2/1945  Fykken _____ 340—58 X NEIL C. READ, *Primary Examiner.*

A. H. WARING, *Assistant Examiner.*